US010582143B2

(12) United States Patent
Vandebriel et al.

(10) Patent No.: US 10,582,143 B2
(45) Date of Patent: Mar. 3, 2020

(54) PROGRAMMABLE STATE MACHINE

(71) Applicant: IMEC VZW, Leuven (BE)

(72) Inventors: Roeland Vandebriel, Leuven (BE);
David San Segundo Bello, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 15/990,124

(22) Filed: May 25, 2018

(65) Prior Publication Data

US 2018/0343409 A1    Nov. 29, 2018

(51) Int. Cl.
| H04N 5/378 | (2011.01) |
| H04N 5/376 | (2011.01) |
| H04N 5/353 | (2011.01) |
| H04N 5/347 | (2011.01) |
| G05B 19/045 | (2006.01) |
| H04N 5/3745 | (2011.01) |
| H04N 5/345 | (2011.01) |
| G06F 8/656 | (2018.01) |
| H04N 5/341 | (2011.01) |

(52) U.S. Cl.
CPC .......... *H04N 5/378* (2013.01); *G05B 19/045* (2013.01); *G06F 8/656* (2018.02); *H04N 5/341* (2013.01); *H04N 5/347* (2013.01); *H04N 5/3454* (2013.01); *H04N 5/3532* (2013.01); *H04N 5/376* (2013.01); *H04N 5/3765* (2013.01); *H04N 5/37455* (2013.01)

(58) Field of Classification Search
CPC .... G05B 19/045; H04N 5/347; H04N 5/3454; H04N 5/37455; H04N 5/376; H04N 5/3765; H04N 5/378; H04N 5/3532
See application file for complete search history.

(56) References Cited

U.S. PATENT DOCUMENTS

| 5,371,518 | A | 12/1994 | Hannah |
| 5,436,659 | A | 7/1995 | Vincent |
| 5,719,965 | A | 2/1998 | Degi et al. |
| 5,825,199 | A | 10/1998 | Shelton et al. |
| 6,509,927 | B1 | 1/2003 | Prater et al. |
| 7,129,978 | B1 | 10/2006 | Brehmer et al. |

(Continued)

OTHER PUBLICATIONS

Extended European Search Report dated Jul. 25, 2018 for Application No. 18174673.6.

*Primary Examiner* — Ngoc Yen T Vu
(74) *Attorney, Agent, or Firm* — Moser Taboada

(57) ABSTRACT

An image sensor comprises: an array (102) of pixels (104) arranged in rows and columns; readout circuitry (110) for reading out image information from pixels (104) in the array (102) of pixels (104); signal lines (112) for providing control signals to the pixels (104) in the array (102) and/or the readout circuitry (110); a programmable sequence controller (114) configured to control the control signals provided on the signal lines (112), said programmable sequence controller (114) comprising: at least one programmable signal controlling state machine (140), which is configured to define a sequence of states and to define control parameters for the states in the sequence, wherein the control parameters include the control signals to be provided on at least one signal line (112) for controlling at least one of a row of pixels (104) or the readout circuitry (110).

12 Claims, 7 Drawing Sheets

C = Continue
I = Incr row
R = Running

(56) References Cited

U.S. PATENT DOCUMENTS

| | | | |
|---|---|---|---|
| 8,264,568 B2* | 9/2012 | Tejada | H04N 5/378 |
| | | | 348/229.1 |
| 9,118,851 B2 | 8/2015 | Dai et al. | |
| 9,237,286 B2 | 1/2016 | Theuwissen | |
| 9,942,490 B2* | 4/2018 | Guicquero | H04N 5/341 |
| 10,270,987 B2* | 4/2019 | Centen | H04N 5/343 |
| 2006/0250510 A1 | 11/2006 | Jacobs et al. | |
| 2009/0021621 A1 | 1/2009 | Hashimoto et al. | |
| 2011/0284727 A1* | 11/2011 | Konishi | H04N 5/3765 |
| | | | 250/214 P |
| 2013/0134295 A1 | 5/2013 | Yan et al. | |
| 2015/0311914 A1 | 10/2015 | Chae et al. | |
| 2016/0037101 A1* | 2/2016 | Shim | H04N 5/374 |
| | | | 348/241 |
| 2016/0234447 A1 | 8/2016 | Guidash et al. | |
| 2016/0269657 A1* | 9/2016 | Nishihara | G01J 1/44 |
| 2016/0269666 A1 | 9/2016 | Guidash | |
| 2016/0277697 A1 | 9/2016 | Diasparra | |
| 2017/0150029 A1 | 5/2017 | Robertson et al. | |

* cited by examiner

PROGRAMMABLE STATE MACHINE

CROSS-REFERENCE TO RELATED APPLICATIONS

This application claims priority to and the benefit of European Patent Application No. 17173286.0, filed on May 29, 2017, the disclosure of which is incorporated herein by reference in its entirety.

TECHNICAL FIELD

The present inventive concept relates to an image sensor and, in particular, to controlling of an image sensor for acquiring an image with the image sensor.

BACKGROUND

Digital imaging is commonly used today in numerous applications. An image sensor for acquiring digital images typically comprises an array of pixels arranged in rows and columns, wherein each pixel comprises a light-sensitive area for detecting light incident on the pixel in order to form an image.

The image sensor may further comprise readout circuitry for reading out image information collected by the pixels and converting the image information to digital domain.

The array of pixels and the readout circuitry may be controlled for controlling acquisition of an image. The pixels in the array may need to be controlled by a sequence of several signals in order to control the pixel to be reset, capture light during an exposure period, and read out the information based on amount of captured light.

Typically, the image sensor may comprise at least one analog-to-digital converter for converting an analog measurement of incident light to a digital value and the image sensor may be controlled such that image information may be read out row by row. The controlling of the image sensor may be provided by a sequencer, which provides an accurate timing of the numerous control signals that needs to be provided to the rows of pixels for controlling exposure times of each row.

The sequencer may need to be very complex, if it is desired to enable different controlling for different regions of interest of the image sensor (such as different exposure times in different regions). If it is desired that the image sensor also or alternatively is to be able to be run in different modes, such as a global shutter mode and a rolling shutter mode, a complexity of the sequencer may be further increased.

In US 2016/0277697, an image sensor is disclosed having a sequencing circuit which comprises a programmable memory containing binary words in which the position i of a bit in a word corresponds to the position i of a respective control signal; and a control signal generation circuit establishing each control signal of position i from the succession of bits of respective position i that are extracted from the memory by a memory controller. The programmable memory allows generating different sequences of control signals. However, the programmable memory requires a large memory capacity in order to enable providing a programming to generate the control signals.

SUMMARY

An objective of the present inventive concept is to enable flexibility in controlling an image sensor without requiring extensive memory capacity.

These and other objectives of the present inventive concept are at least partially met by the invention as defined in the independent claims. Preferred embodiments are set out in the dependent claims.

According to a first aspect, there is provided an image sensor comprising: an array of pixels arranged in rows and columns; readout circuitry for reading out image information from pixels in the array of pixels; signal lines for providing control signals to the pixels in the array and/or the readout circuitry; a programmable sequence controller configured to control the control signals provided on the signal lines, said programmable sequence controller comprising: at least one programmable signal controlling state machine, which is configured to define a sequence of states and to define control parameters for the states in the sequence, wherein the control parameters include the control signals to be provided on at least one signal line for controlling at least one of a row of pixels or the readout circuitry.

According to the invention, the programmable sequence controller comprises a programmable signal controlling state machine. The programmable signal controlling state machine may thus control the control signals to be provided in the image sensor based on states of the programmable signal controlling state machine. This implies that a very efficient use of memory resources may be provided as the programmable signal controlling state machine may maintain a specific control signal as long as the states of the programmable signal controlling state machine are not changed.

The programmable signal controlling state machine may provide a flexible control of the image sensor, as the programmable signal controlling state machine may provide an output that is dependent on an input to or an internal state within the programmable signal controlling state machine. The control parameters may control a sequence of signals for controlling the image sensor in a desired manner. The programmable signal controlling state machine may be re-programmed in order to change the sequence of control signals such that a functionality of the image sensor may be changed. However, the programmable signal controlling state machine could also provide different sequences of control signals or different durations of the control signals merely based on different inputs or different internal states being provided in the programmable signal controlling state machine, such that re-programming may not be necessary in order to vary the functionality of the image sensor.

The programmable signal controlling state machine may be used for controlling the control signals provided to at least one row of pixels. The control signals may thus define exposure times for the at least one row and may also define how detected light may be read out (and possibly combined from plural pixels). The programmable signal controlling state machine could also or alternatively be used for controlling the control signals provided to the read-out circuitry. This may be used e.g. to define when the information of detected light in the pixels is to be read out and converted to digital form and/or for controlling calibration of analog-to-digital converters of the read-out circuitry.

The programmable signal controlling state machine may allow branching of a sequence of states. Thus, the sequence of states defined by the programmable signal controlling state machine may not always be identical (even without re-programming of the programmable signal controlling state machine). Rather, depending e.g. on an input value or an internal state of the programmable signal controlling state machine, the sequence of states may be branched between two or more options providing different durations of states or different sequences of states.

According to a second aspect, there is provided an image sensor comprising: an array of pixels arranged in rows and columns; signal lines for providing control signals to elements of the image sensor; a programmable sequence controller configured to control the control signals provided on the signal lines, said programmable sequence controller comprising: at least one programmable signal controlling state machine, which is configured to define a sequence of states and to define control parameters for the states in the sequence, wherein the control parameters include the control signals to be provided on the signal lines; and wherein the at least one programmable signal controlling state machine comprises at least two branches of sequences of states and is configured to select branch based on an input to the programmable signal controlling state machine.

Thus, according to this second aspect, the programmable signal controlling state machine may be configured to define different branches of sequences of states, such that the programmable signal controlling state machine may inherently carry information for providing different sequences of control signals on the signal lines without need of re-programming the programmable signal controlling state machine. Hence, based on an input, such as a state of another element in the image sensor or an external signal, to the programmable signal controlling state machine a branch may be selected for defining the sequence of states that the programmable signal controlling state machine is to go through.

This implies that the image sensor may be highly flexible and easily adapted to change between different sequences of states which may provide different output from the image sensor. A selection of a branch may apply to the entire array of pixels so that control of the array may be changed between different modes of acquiring images. However, the selection of a branch may alternatively apply to a subset of rows of pixels, such that e.g. a region of interest in the array may be switched to a different mode.

The second aspect may be combined with the first aspect, such that the programmable signal controlling state machine comprising at least two branches may be used in the image sensor defined in the first aspect above. Below embodiments of the image sensor are defined. It should be realized that these embodiments may be combined with any one of the first and second aspects of the image sensor defined above.

According to an embodiment, the programmable sequence controller further comprises at least one row controller, which is configured to define a row number in the array of pixels to which the state defined by the at least one programmable signal controlling state machine is to be applied. Thus, the programmable signal controlling state machine may provide a sequence of states that controls the control signals to be provided on at least one signal line for controlling at least one of a row of pixels, but need not keep track of which row the control signals are to be provided to. This implies that changing the regions of interest in the array of pixels may be easily re-defined by changing a set-up of the row controller, without a need of re-programming the programmable signal controlling state machine. The at least one row controller and the at least one programmable signal controlling state machine may communicate with each other for controlling at least when the at least one programmable signal controlling state machine is to move from a current state to a next state in the sequence of states.

According to an embodiment, the programmable sequence controller further comprises a demultiplexer, wherein the demultiplexer is configured to receive control parameters including control signals from the at least one programmable signal controlling state machine and row selection information from the at least one row controller and wherein the demultiplexer is configured to output the control signals for provision on the signal lines of the at least one row indicated by the row selection information.

The demultiplexer may thus combine the input from the at least one programmable signal controlling state machine and the at least one row controller for outputting the control signals on the desired signal lines.

According to an embodiment, the programmable sequence controller further comprises a state storage element, which is configured to receive control signals from the demultiplexer and is configured to store control signals for each row. The state storage element may thus store the control signals that are to be output on the signal lines. Thus, the control signals may be maintained by the state storage element so that a control signal on a signal line is maintained until the state storage element is updated.

According to an embodiment, the at least one row controller comprises at least one programmable row controlling state machine. Thus, the row controller may be provided as a state machine allowing the row controller to provide an output that is dependent on a state of the row controller. This may provide a flexibility of the output provided by the at least one row controller, which may increase the flexibility of operating the image sensor in different modes.

According to an embodiment, the at least one programmable row controlling state machine and the at least one programmable signal controlling state machine are configured to communicate with each other, wherein the at least one programmable signal controlling state machine is configured to change states based on input from the at least one row controlling state machine.

Thus, the interaction between the programmable signal controlling state machine and programmable row controlling state machine may allow the states of the state machines to be controlled by signals communicated between the state machines. This may for instance allow the programmable signal controlling state machine to select a branch based on input from the row controlling state machine, which may e.g. allow a region of interest to be controlled in a separate manner than other regions of the array.

According to an embodiment, the programmable sequence controller comprises a plurality of programmable row controlling state machines and a plurality of programmable signal controlling state machines, wherein each pair of a programmable row controlling state machine and a programmable signal controlling state machine defines a separately controllable region of interest in the array of pixels. Thus, each region of interest may be controlled by a pair of a programmable signal controlling state machine and a programmable row controlling state machine, wherein each pair of state machines may be differently programmed in order to ensure that the regions of interest is controlled in a desired manner independently of the other regions of interest of the array.

According to an embodiment, the programmable sequence controller comprises an input for receiving an external signal for re-programming the programmable sequence controller. The programmable sequence controller may be versatile in its programming. Nevertheless, the programmable sequence controller may be re-programmed e.g. for updating the programmable sequence controller or for changing operational modes of the image sensor. The re-programming may thus be conveniently provided by receipt of an external signal by the programmable sequence controller.

According to an embodiment, the programmable sequence controller comprises a buffer memory and a re-programming memory, which each is configured to store a current set of states for the at least one programmable signal controlling state machines.

This implies that, when the programmable sequence controller is to be updated or re-programmed, a double buffering process may be used, wherein the programmable sequence controller may acquire a frame by the image sensor based on a set of states in the buffer memory while the re-programming memory is updated to a new set of states. Thus, once the re-programming memory has been updated, the next frame may be acquired using the set of states of the re-programming memory. The buffer memory may be updated in preparation of re-programming the programmable sequence controller or may be updated as soon as possible, e.g. during acquiring of a frame, so that the programmable sequence controller is always prepared for being re-programmed.

According to an embodiment, the programmable sequence controller is configured to be re-programmed for dynamically changing an operational mode of the image sensor. Thus, the image sensor may easily be shifted between different operational modes by re-programming of the programmable sequence controller.

According to an embodiment, the operational mode of the image sensor is changed between at least two operational modes in the group of: a global shutter mode; a rolling shutter high-resolution mode; a rolling shutter low-resolution binning mode; using different integration times for different regions of interest; and an analog-to-digital conversion calibration mode. The high-resolution mode may be a mode wherein light detected in each pixel is separately read out, whereas the low-resolution binning mode may be a mode wherein light detected in plural pixels is binned and combined to a single value. Defining of multiple regions of interest and varying integration times for different regions of interest may be highly useful in various applications, e.g. in high dynamic range imaging.

The image sensor may be a CCD image sensor and a programmable sequence controller may be configured to change operational modes of the image sensor e.g. based on controlling selection of stages in the CCD imaging and readout and based on controlling multiple CCD arrays within a single chip of the image sensor, wherein the multiple CCD arrays may be differently controlled.

According to an embodiment, the programmable sequence controller further comprises a readout controller for controlling readout of image information acquired by the pixels to a readout block. Thus, readout of information from the pixels to a readout block may be controlled by a separate readout controller. The readout controller may also be provided as a programmable signal controlling state machine for providing control signals, e.g. via the demultiplexer, to the signal lines, and a programmable row controlling state machine, which may control which row(s) are to receive the control signals.

According to a third aspect, there is provided a camera comprising the image sensor according to the first or the second aspect.

Effects and features of this third aspect are largely analogous to those described above in connection with the first and second aspects. Embodiments mentioned in relation to the first and second aspects are largely compatible with the third aspect.

The camera may thus easily be controlled to be operated in different operational modes, providing a flexibility of the camera.

According to a fourth aspect, there is provided a method for acquiring images using an image sensor comprising an array of pixels arranged in rows and columns, readout circuitry for reading out image information from pixels in the array of pixels, and signal lines for providing control signals to the pixels in the array and/or the readout circuitry; said method comprising receiving control parameters including control signals from at least one programmable signal controlling state machine based on a current state of the at least one programmable signal controlling state machine; receiving row number information from at least one row controller; generating and outputting control signals on the signal lines based on the control parameters; updating state of the at least one programmable signal controlling state machine to change the control parameters output by the at least one programmable signal controlling state machine; wherein a sequence of control signals are generated and outputted on the signal lines based on updates of the state of the at least one programmable signal controlling state machine, said sequence of control signals causing acquiring of an image frame by the array of pixels and/or calibration of analog-to-digital conversion of the readout circuitry.

Effects and features of this fourth aspect are largely analogous to those described above in connection with the first, second and third aspects. Embodiments mentioned in relation to the first, second and third aspects are largely compatible with the fourth aspect.

The programmable signal controlling state machine and the row controller may thus control the functionality of the image sensor such that the image sensor may be operated in different modes.

The at least one programmable signal controlling state machine may be configured to change the control parameters being output based at least on a clock counter and possibly on further input from the row controller. A row controller may thus affect a change of states of a programmable signal controlling state machine in order to control when a change of states is to occur.

According to an embodiment, the method further comprises acquiring a first image frame based on first instructions of the at least one programmable signal controlling state machine defining a first operational mode of the image sensor; receiving an external signal for re-programming the at least one programmable signal controlling state machine with second instructions; and acquiring a second image frame based on the second instructions of the at least one programmable signal controlling state machine defining a second operational mode of the image sensor. Thus, the image sensor may be used in different operational modes and the operational mode may be easily switched by re-programming the programmable signal controlling state machine(s).

According to an embodiment, the first frame is acquired in a rolling shutter high-resolution mode and the second frame is acquired in a rolling shutter low-resolution binning mode.

Hence, the same image sensor may be used for acquiring both a high-resolution image, which may require a longer read-out time and may also be more sensitive to blurring due to fast-moving objects, and a low-resolution image, which may require a shorter read-out time and may be less sensitive to blurring, but on the other hand provides a lower resolution.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
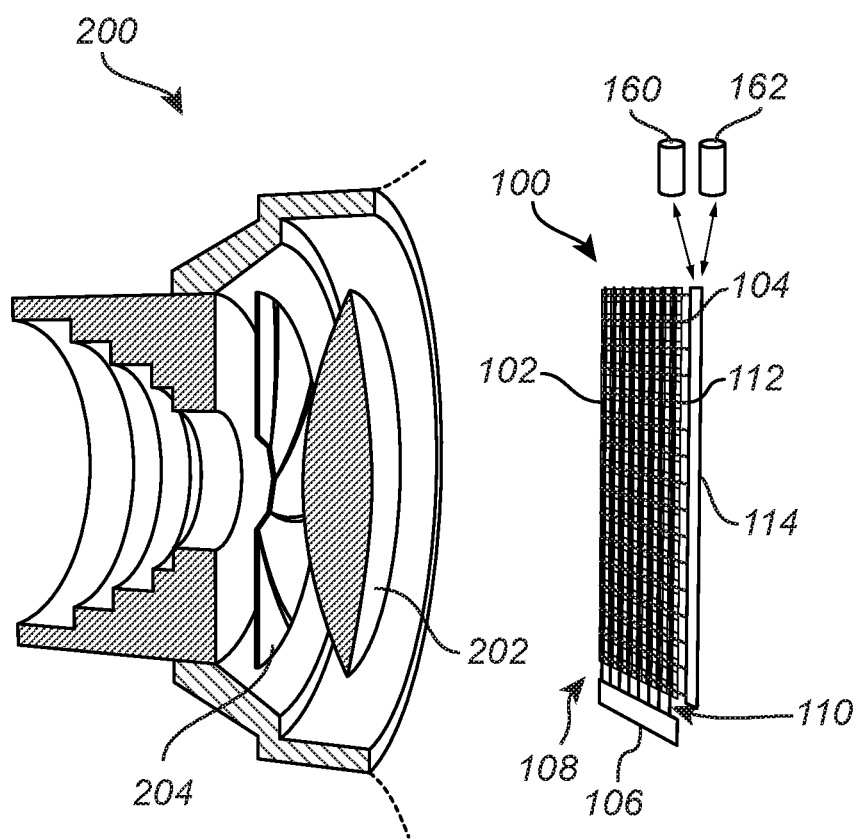
FIG. 1 is a schematic view of a camera comprising an image sensor according to an embodiment.

FIG. 1 illustrates an image sensor 100. The image sensor 100 comprises an array 102 of pixels 104, which are arranged in rows and columns of the array 102. Each pixel 104 has a light-sensitive area, which is arranged to detect light incident on the light-sensitive area and provide a measurement indicative of an amount of incident light. The image sensor 100 may thus acquire an image based on detecting incident light on the respective pixels 104 of the array 100.

It should be realized that the pixels 104 may be formed in several different manners, which may affect how the light detection of the pixels 104 is controlled. However, several different manners of controlling the pixels 104 and detecting light are known as appreciated by a person skilled in the art. For instance, the pixels 104 may form part of a charge-coupled device (CCD), wherein the pixels 104 generate an electrical charge indicative of incident light, which charge may then be moved between pixels 104 in order to read-out image information. Alternatively, the pixels 104 may be formed based on complementary metal-oxide-semiconductor (CMOS) technology and a voltage may be generated in the pixels 104 based on incident light. CMOS-based image sensors 100 provide a greater flexibility in controlling the image sensor 100 and the description below will therefore be made in relation to such image sensors 100. However, it should be realized that CCD image sensors 100 may be used instead and that the controlling of the image sensor 100 described below could alternatively be applied to a CCD image sensor 100.

As illustrated in FIG. 1, the image sensor 100 may be installed in a camera 200, which may comprise optical components, such as one or more lenses 202, apertures 204, and filters. The optical components may thus control light which reaches the image sensor 100, whereas the image sensor 100 may capture the incident light and form an image based on incident light.

The detected light in the array 102 of pixels 104 may be read out through a read-out block 106 of the image sensor 100. The read-out block 106 may comprise at least one analog-to-digital converter (ADC) for converting an analog measurement of incident light to a digital value. The read-out block 106 may thus create a matrix of digital values which may form a digital representation of an image acquired by the image sensor 100. The digital representation may be transferred to an image processing unit in the camera 200 for possible further processing.

The image sensor 100 may comprise control circuitry 108 for controlling the image sensor 100 and ensuring that a digital representation of an image is formed in a desired manner. The control circuitry 108 may comprise readout circuitry 110 for reading out the measurements of detected light in the light-sensitive areas of the pixels 140. The control circuitry 108 may further comprise signal lines 112 for providing control signals to the pixels 104 in the array 102 for controlling detection of light and for providing control signals to the readout circuitry 110 for reading out the measurements of detected light.

The control circuitry 108 may further comprise a sequence controller 114 for controlling generation of control signals so as to control acquiring and reading out of images by the image sensor 100. The sequence controller 114 may be configured to allow a flexible control of the image sensor 100 such that the image sensor 100 may e.g. be varied between different operational modes, as will be described in further detail below.

The image sensor 100 may be arranged on a single chip, such that control of the acquiring of images and the array 102 of pixels 104 may be arranged on a self-contained chip, which may output a digital representation of an image. The self-contained chip may have an input for receiving an external signal, which may be used for re-programming the control circuitry 108, e.g. if changes to the operation of the image sensor 100 is desired.

Figure 2:
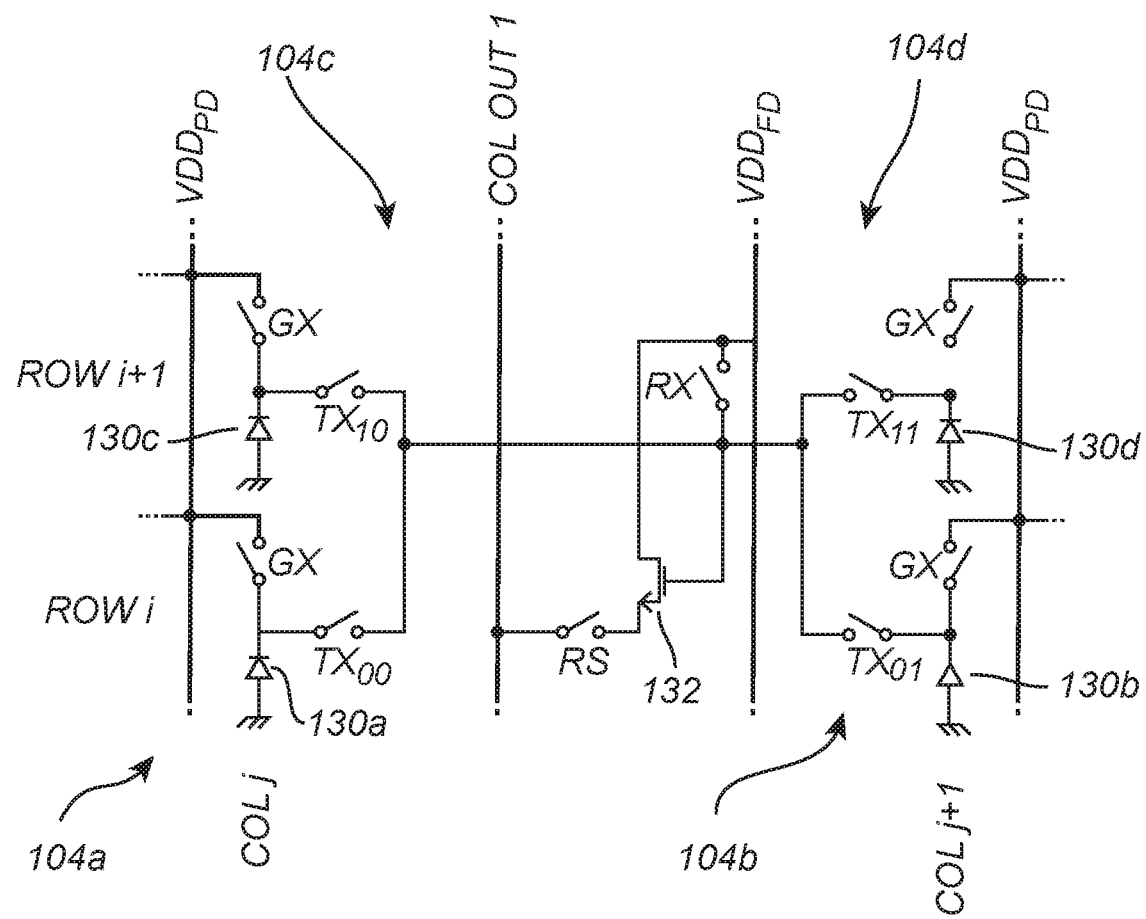
FIG. 2 is a schematic view of a set-up of pixels in the image sensor.

Referring now to FIG. 2, a set-up of pixels 104 according to an embodiment is shown in greater detail. It should be realized that this set-up of pixels 104 is described in order to allow illustrating that the image sensor 100 may be operated in different operational modes. As realized by a person skilled in the art, the set-ups of pixels 104 may be configured in numerous different ways, such as a standard 4T pixel.

In FIG. 2, four pixels 104a-d arranged in a 2×2 configuration are shown. Each pixel 104a-d comprises a light-sensitive area (illustrated here as a diode 130a-d). The pixels 104a-d share a floating diffusion 132, which is connected to a reset switch RX for resetting the floating diffusion 132. Each pixel 104a-d also comprises a transfer gate $TX_{00}$, $TX_{01}$, $TX_{10}$, $TX_{11}$ for transferring the information in the pixel 104a-d to the floating diffusion 132. Also, each pixel 104a-d further comprises a global shutter switch GX for resetting the pixel 104a-d in a global shutter mode.

In a rolling shutter mode, each of the diodes 130a-d may be reset and read separately in time in order to provide a high-resolution image. However, the diodes 132a-d may be simultaneously connected to the floating diffusion 132 for analog binning of the light detected in the four pixels 104a-d. This implies that an improved sensitivity is provided as the signal from the four pixels 104a-d may be combined without increasing the noise level, but the resolution of the image is lower.

It is clear that an image sensor 100 comprising a set-up of pixels 104 as shown in FIG. 2 may be used in different operational modes, requiring a different sequence of control signals in order to correctly control the image sensor 100. Also, regions of interest may be defined in the array 102 such that the region of interests may be differently controlled.

Figure 3:
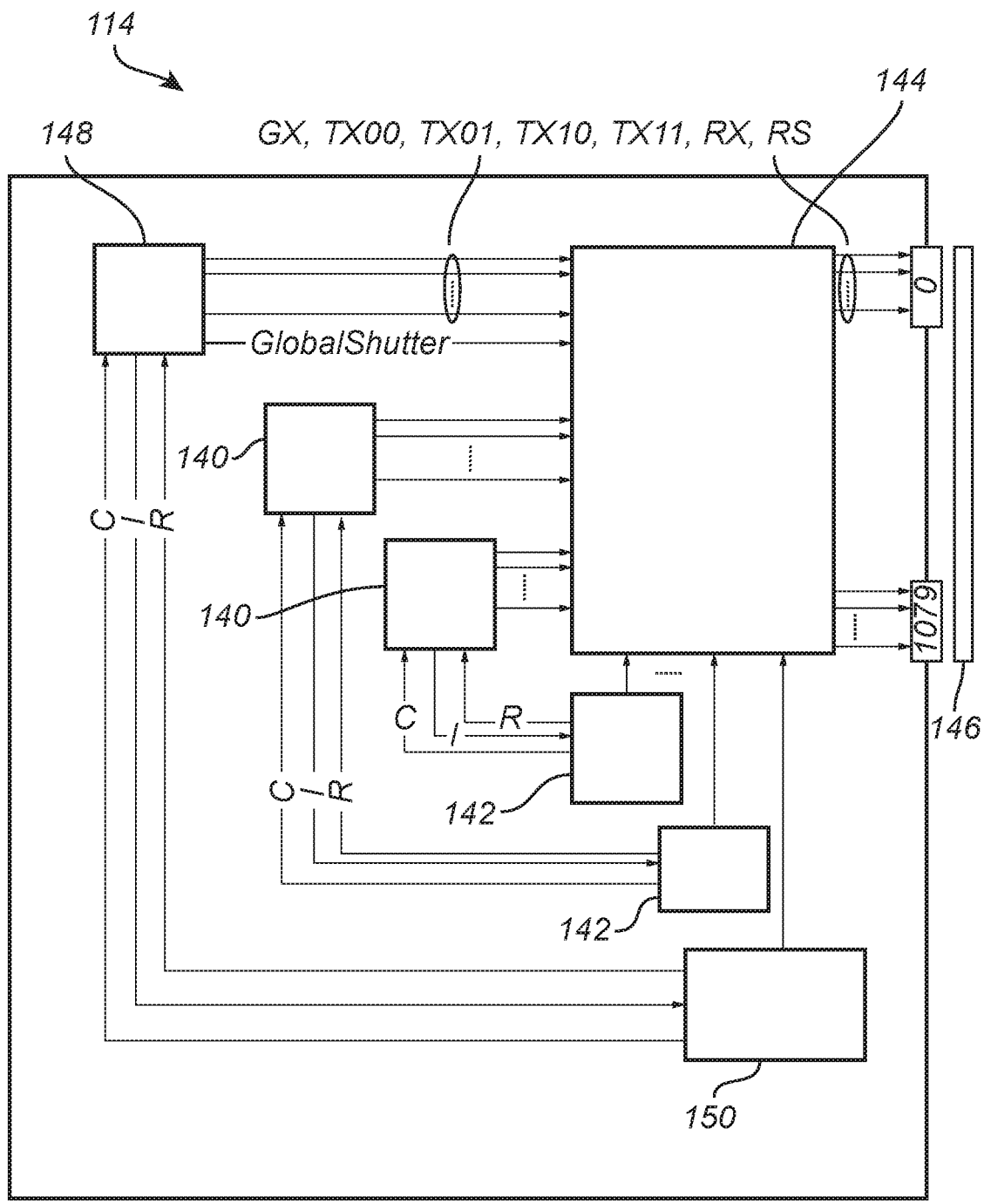
FIG. 3 is a schematic view of a programmable sequence controller according to an embodiment.

Referring now to FIG. 3, a sequence controller 114 will be described providing a flexibility of controlling an image sensor 100 in different operational modes and/or controlling separate regions of interest differently.

The sequence controller 114 is programmable and is configured to control the control signals provided on the signal lines 112. The sequence controller 114 comprises at least one programmable signal controlling state machine 140, here illustrated as four different programmable signals controlling state machines 140*a-d*, which in this particular implementation are configured to control up to four different integration times to be used in the array 102 of pixels 104.

The sequence controller 114 also comprises at least one row controller 142, here illustrated as four different programmable row controlling state machines 142*a-d* for defining a row number in the array 102 of pixels 104 to which a state defined by the programmable signal controlling state machines 140*a-d* is to be applied.

The sequence controller 114 further comprises a demultiplexer 144, which is configured to receive input from the programmable signal controlling state machines 140*a-d* and the programmable row controlling state machines 142*a-d* and outputs control signals on the signal lines 112 based on these inputs.

The sequence controller 114 may further comprise a state storage element 146. The state storage element 146 may receive the output from the demultiplexer 144 and may comprise a storage portion for each row of the array 102. The state storage element 146 may thus maintain a value for the control signals to be applied on the signal lines 112 for each row until an update value is provided from the demultiplexer 144. Thus, the demultiplexer 144 may not need to continuously output values for the control signals, when the control signal is not to be changed.

Each of the programmable signal controlling state machines 140 may define a sequence of states. Control parameters may be defined for the states, wherein the control parameters may include the control signals that are to be provided on the signal lines 112.

A state in the programmable signal controlling state machine 140 may be defined by:

Signal level: The level that the GX, $TX_{00}$, $TX_{01}$, $TX_{10}$, $TX_{11}$, RX, and RS signals should have.

Cycles: The number of clock cycles the state is active.

NextState: The state that should follow after the current state when the number of clock cycles is reached.

EnCont: Mask of a continue input signal. 0=The next state will always be the state programmed in the NextState field. 1=The Next state will be the current state+1 when the continue input signal is active. The continue input signal may be controlled by the programmable row controlling state machine 142.

IncRow: This signal indicates to the programmable row controlling state machine 142 to increment the row counter.

ADCStart: An output which may be used to initiate a start of ADCs of the read-out block 106, when the acquired image is to be converted to a digital representation.

The signal levels may provide 1 bit (i.e. 0 or 1), which define the signal to be provided on the respective signal lines 112. Thus, while the state of the programmable signal controlling state machine 140 is maintained, the signal level of the signal lines 112 may be held to correspond to the signal levels defined by the state.

The Cycles parameter may define the number of clock cycles that a state may be active. Thus, by means of the value defined by the Cycles parameter, the signal levels may be maintained for a long period of time. This implies that a low amount of memory is required in order to store the signal levels that are to be maintained for a long period of times (as compared to storing the signal level for each clock cycle).

A signal defining a single clock unit for the Cycles parameter may be a system clock but it can also be any other signal e.g. a clock signal derived from the system clock by dividing its frequency, or a separate signal. The programmable signal controlling state machine 140 may further comprise another parameter relating to a clock signal, such that a choice of clock signal may be provided. Hence, by defining that a slow clock signal is to be applied, a long duration of a time of a state may be defined by means of fewer bits, since the number defined by the Cycles parameter may be defined by substantially fewer bits.

The NextState parameter may define which state the programmable signal controlling state machine 140 should move to when the number of cycles have passed. Thus, the programmable signal controlling state machine 140 may be programmed to move to a state in which the programmable signal controlling state machine 140 has already been so as to form a loop over two or more states. The loop may be broken via the enable continue EnCont parameter, which may enable the programmable signal controlling state machine 140 to move to the current state +1, instead of repeating the loop. If the enable EnCont parameter is high and a continue signal received from the programmable row controlling state machine 142 is high, the programmable signal controlling state machine 140 may move to the current state +1 instead of the defined NextState when the number of cycles have been repeated.

The NextState parameter in combination with the EnCont parameter may also enable branching of the programmable signal controlling state machine 140 between at least two branches of sequences of states. Thus, if the NextState parameter defines a state which is several states ahead of the current state and the EnCont parameter is high, the programmable signal controlling state machine 140 may move to this state unless the continue signal is received and the programmable signal controlling state machine 140 moves to the current state +1. This implies that two different branches are defined by the NextState parameter and the EnCont parameter and a branch may be selected based on the continue signal received.

The programmable signal controlling state machine 140 may output the value of the IncRow parameter to the programmable row controlling state machine 142, e.g. in the last clock cycle, before the programmable signal controlling state machine 140 changes state. If the IncRow parameter is programmed as "1", the programmable row controlling state machine 142 may move to the next row.

Based on the above programming of the programmable signal controlling state machine 140, the programmable signal controlling state machine 140 may move through a sequence of states e.g. for starting integration in the pixels 104 in a region of interest. In the sequence of states, different control parameters are provided to the signal lines 112 such that a sequence of signals may be provided for starting integration. For instance, in a rolling shutter mode, first a signal to the switch $TX_{00}$ may be high to reset the photodiode 130*a* of the pixel 104*a* before a signal to the switch $TX_{01}$ is high to reset the photodiode 130*b* of the pixel 104*b*. When the controlling is moved to a next row, first a signal to the switch $TX_{10}$ is high to reset the photodiode 130*c* of the pixel 104*c* before a signal to the switch $TX_{11}$ is high to reset the photodiode 130*d* of the pixel 104*d*. Resetting a pixel also includes that a signal to the switch RX is high in order to reset the floating diffusion 132. Thus, the programmable signal controlling state machine 140 may need to move through a number of states in order to start integration in a desired manner. The programmable row controlling state machine 142 may then also control when the programmable signal controlling state machine 140 is to control a next row.

The programmable signal controlling state machine 140 may access register files in a memory, wherein each register file may comprise settings for each of the states of the programmable signal controlling state machine 140. The register files may thus define each of the states of the programmable signal controlling state machine 140.

The programmable row controlling state machine 142 may define an active row in a region of interest. The programmable row controlling state machine 142 may define the following parameters:

Start Row index: The first row index of the region of interest.
Row Offset: The row offset is a step size of the row index when an IncRow signal is activated.
Nr Cycles: Number of cycles a state of the programmable row controlling state machine 142 should stay active.
IntTime: The integration time where the region of interest should be active.
Continue signal: The value that the Continue signal should get for the state of the programmable row controlling state machine 142. The continue signal is connected to the programmable signal controlling state machine 140 and can be used to control the state machine 140.
NextROI: Next region of interest. The region of interest that should come active after the Nr Cycles is reached.

Since every region of interest can only be active for one of the integration times defined by the respective programmable signal controlling state machines 140, some definitions may be shared for the states of the region of interest: Start Row index, Row offset, Nr Cycles, and the Integration time. The Continue signal and the NextROI definitions may be defined per state of the programmable row controlling state machine 142.

The programmable row controlling state machine 142 may access register files in a memory, wherein each register file may comprise settings for each of the states of the programmable row controlling state machine 140. Also, shared register files may be provided for the information shared by all the states.

The sequence controller 114 may further comprise a programmable readout signal controlling state machine 148, which is configured to provide control parameters for controlling readout of image information from the pixels 104 of the entire array 102 and a corresponding programmable readout row controlling state machine 150. The programmable readout signal controlling state machine 148 and the programmable readout row controlling state machine 150 may be configured in a similar manner as the programmable signal controlling state machines 140 and the programmable row controlling state machines 142, described above, but the states are controlled in order to provide readout signals to the pixels 104.

The programmable readout signal controlling state machine 148 may also be configured to provide a global shutter signal, which may then be provided simultaneously to all rows of the array 102.

The programmable sequence controller 114 may be programmed to provide different integration times for the different regions of interest. In one embodiment, the integration times may be defined in relation to a common readout profile for the array 102, such that the readout of the image information is made in a continuous manner for the rows to be read. Each pair of a programmable signal controlling state machine 140 and the programmable row controlling state machine 142 may then set states with respect to whether the region of interest is to be active in a specific integration time or not.

In order to illustrate how different integration times may be defined for regions of interest, a few examples are given with reference to FIGS. 4-7.

Figure 4:
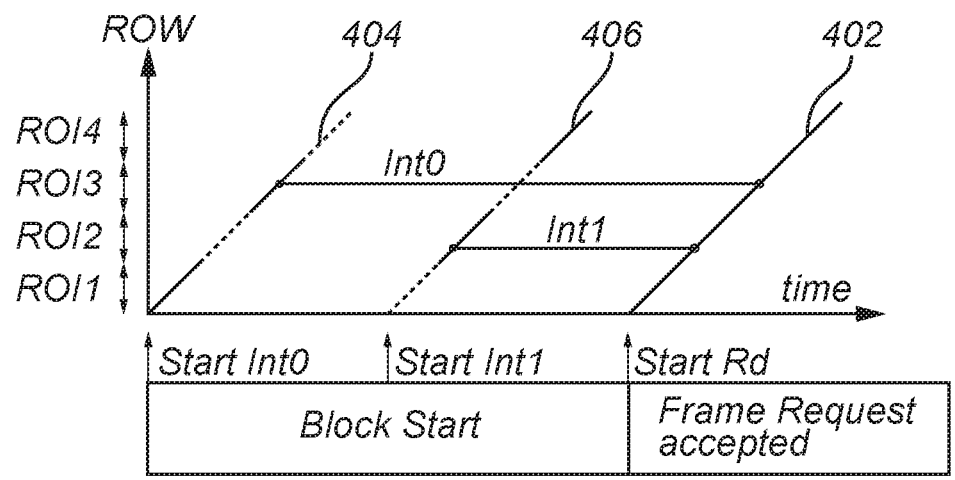
FIGS. 4-7 are diagrams illustrating control of a plurality of regions of interest in an array of pixels.

In FIG. 4, a straight profile is defined. All rows of the array 102 are active and are read out continuously row by row, as illustrated by line 402. Two different integration times Int0 and Int1 are defined in a rolling shutter mode and the start time of the integration times Int0 and Int1 according to a rolling shutter mode are indicated by lines 404 and 406, respectively. In the example illustrated in FIG. 4, regions of interest ROI1 and ROI3 are active during integration time Int0, whereas regions of interest ROI2 and ROI4 are active during integration time Int1.

During the time from start of Int0 to start of the readout, a block start indicator may be set, as no new frame request may be accepted during this time (as no row has yet been read). After this period, a new integration may be started for the rows that have been read, even though not all rows have yet been read out.

Figure 5:
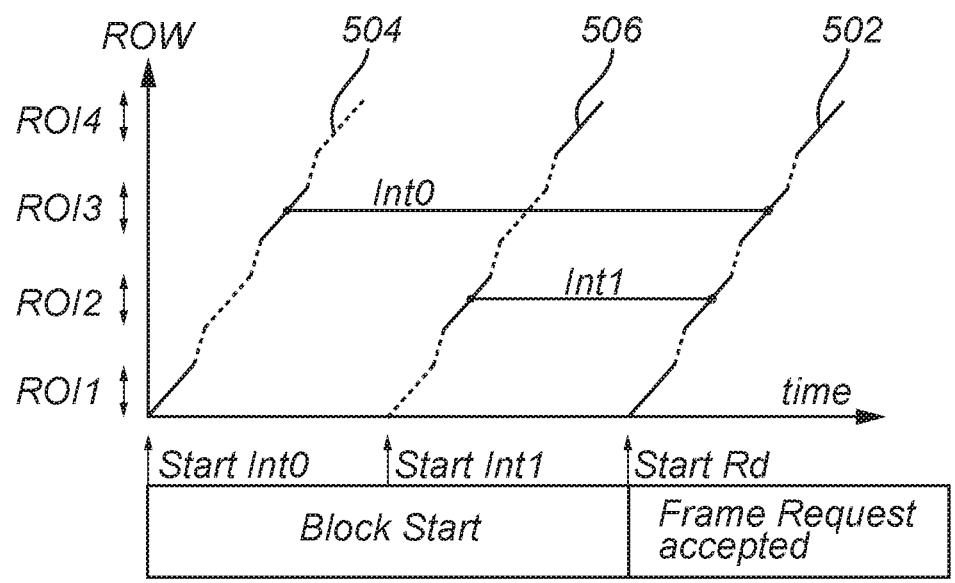

In FIG. 5, a split profile is defined. In this profile, not all rows of the array 102 are read. Rather, there are gaps between the regions of interest. The row counters of the programmable row controlling state machines 142 may step over these gaps, so that the active rows may be read out continuously without a gap in time between the regions of interest, as illustrated by the dashed portions of the lines 502, 504, 506. Similarly to the profile in FIG. 4, two different integration times Int0 and Int1 are defined in a rolling shutter mode and the start time of the integration times Int0 and Int1 according to a rolling shutter mode are indicated by lines 504 and 506, respectively. In the example illustrated in FIG. 5, regions of interest ROI1 and ROI3 are active during integration time Int0, whereas regions of interest ROI2 and ROI4 are active during integration time Int1.

Figure 6:
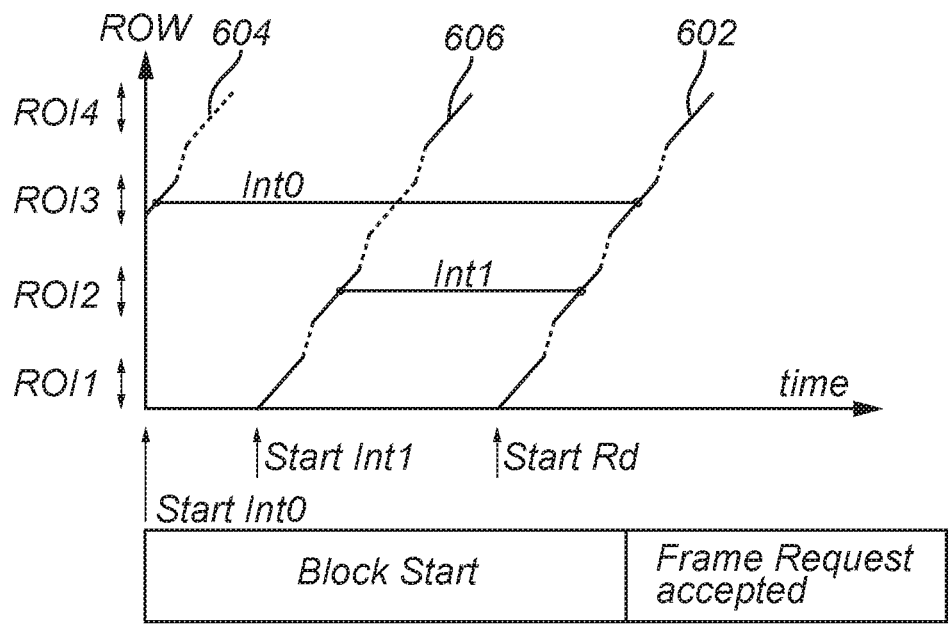

In FIG. 6, a non-zero start profile is defined. Here, the programmable signal controlling state machine 140 defining the first integration time is not applied to the entire array 102, but rather starts in region of interest ROI3, as illustrated by line 604. The integration time Int1 starts in the first region of interest ROI1 and follows the entire profile of the array 102, as illustrated by line 606. Also, readout is performed continuously row by row, as illustrated by line 602. Since integration starts in ROI3, a new frame request can only be accepted when the first row of ROI3 has been read out.

Figure 7:
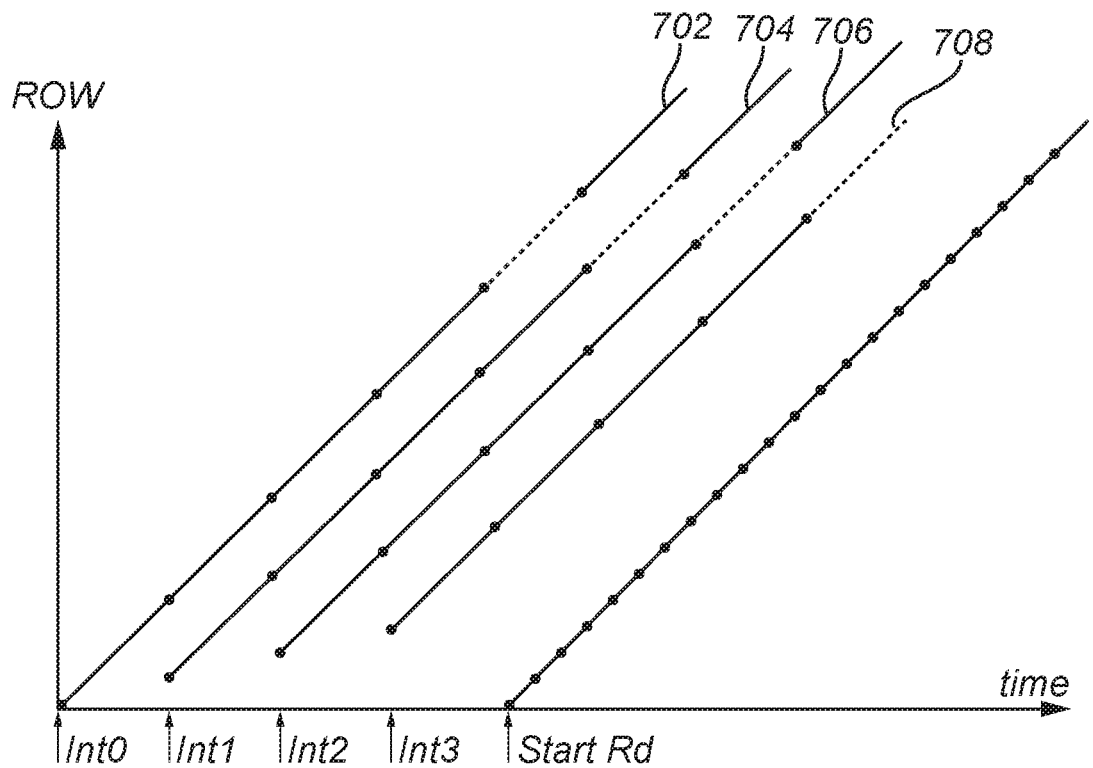

In FIG. 7, an interleaved profile is defined. Here, four different integration times are defined by the programmable signal controlling state machines 140. For every integration time, there is a separate region of interest defined, which comprises interleaved rows in the array 102, wherein the dots on the lines 702, 704, 706, 708 indicates a row that is included in the respective integration time. The programmable row controlling state machines 142 may use the Row Offset for defining the interleaving of the regions of interest.

Figure 8:
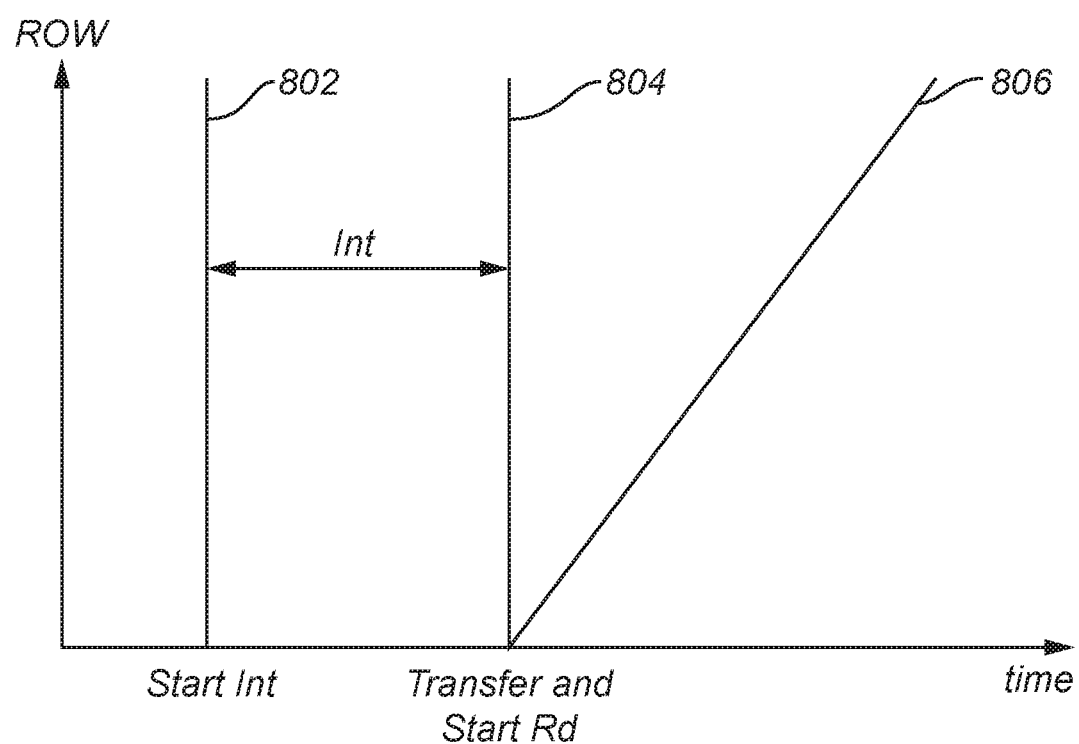
FIG. 8 is a diagram illustrating control of an image sensor in global shutter mode.

In FIG. 8, operation of the image sensor 100 in a global shutter mode is illustrated. Here, a global reset of all photodiodes of the pixels 104 may be simultaneously provided by a signal to the GX switches in FIG. 2 being high. Thus, a single start of the integration time is defined for the pixels 104, as indicated by line 802. At an end of the integration time, the floating node 132 may be reset by the signal to the RX switches being high, followed by the signals to the TX switches being high in order to transfer the electrical charge accumulated in the photodiodes to the floating nodes 132. This may be done for all pixels 104 simultaneously as indicated by line 804. Then, readout of the rows may be started row by row, as indicated by line 806, in order to read out the entire frame.

As illustrated in FIG. 1, the programmable sequence controller 114 may comprise a buffer memory 160 and a re-programming memory 162. When re-programming of the programmable sequence controller 114 is to be performed, the programming for the programmable sequence controller 114 may be stored in the buffer memory 160 such that a frame may be acquired using the programming in the buffer memory 160. During acquiring of the frame, an updated programming may be provided through an external signal and stored in the re-programming memory 162. The re-programming memory 162 may thus define a new setting to be used in acquiring of a next frame. The use of two memories, a buffer memory 160 and a re-programming memory 162, allows re-programming of the programmable sequence controller 114 without need of a halt in acquiring frames for re-programming of the programmable sequence controller 114. It should be realized that a single memory may be used instead. However, then the present programming of the programmable sequence controller 114 may not be used during re-programming.

As discussed above, the programmable sequence controller 114 may be used for controlling the image sensor 100 to operate such that different settings may be used for different regions of interest. As illustrated in FIGS. 4-8, different integration times may be defined for different regions of interest in a rolling shutter mode, and the image sensor 100 may also be operated in different modes (rolling shutter mode or global shutter mode). It should be realized that the image sensor 100 may be controlled in many different ways to define different regions of interest and different operational modes. For instance, if the set-up of pixels 104 is arranged as illustrated in FIG. 2, the image sensor 100 may be shifted between a global shutter mode, a rolling shutter high-resolution mode and a rolling shutter low-resolution binning mode, by defining different sequences of control signals to be applied on the signal lines 112. Different variations of the settings for acquiring an image may be used for different regions of interest in any of these modes.

Further, the image sensor 100 may also be set in an analog-to-digital conversion calibration mode, which may be performed e.g. during start-up of the image sensor 100 and/or at regular intervals between acquiring of two frames. Analog-to-digital conversion calibration may be needed to handle variations in analog-to-digital conversion e.g. due to temperature and/or voltage variations.

The analog-to-digital conversion calibration mode may also be controlled by the programmable sequence controller 114 or a separate analog-to-digital conversion state machine in the image sensor 100. The ADCs of the read-out block 106 may use a plurality of buffered voltage references. The analog-to-digital conversion calibration may involve measuring the reference voltages by an analog circuit and comparing the reference voltages to thresholds in order to determine whether the reference voltages need to be updated. Start of the analog-to-digital conversion calibration mode may be connected to the programmable signal controlling state machines 140 and the programmable readout signal controlling state machine 148 and a timer in the sequence controller 114.

Figure 9:
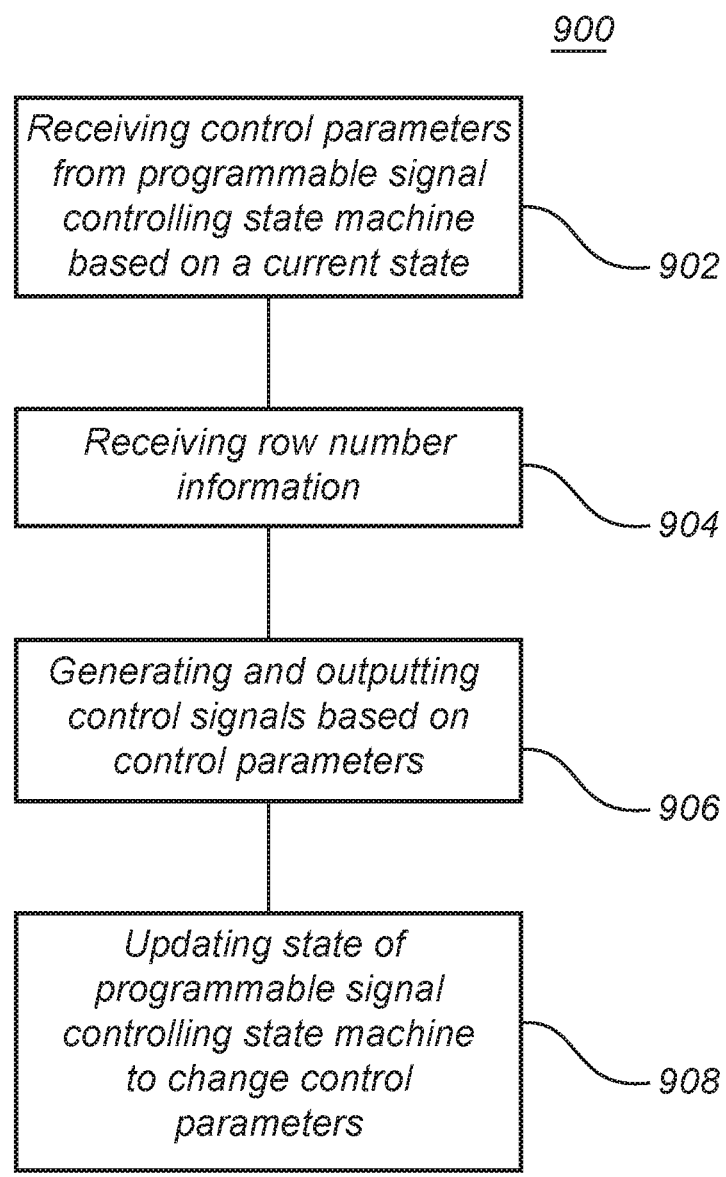
FIG. 9 is a flow chart of a method according to an embodiment.

Referring now to FIG. 9, a method 900 for acquiring images using the image sensor 100 will be described.

The method comprises receiving 902 control parameters including control signals from at least one programmable signal controlling state machine 140 based on a current state of the at least one programmable signal controlling state machine 140. The method further comprises receiving 904 row number information from at least one row controller 142.

Based on the control parameters and the row number information, the control signal to be applied on a signal line 112 may be determined. The method thus further comprises generating and outputting 906 control signals on the signal lines 112 based on the control parameters.

A sequence of control signals may cause the acquiring of an image by means of the array 102 of pixels. The sequence of control signals may be generated based on the at least one programmable signal controlling state machine 140 moving through a sequence of states. The method may therefore further comprise updating 908 state of the at least one programmable signal controlling state machine 140 to change the control parameters output by the at least one programmable signal controlling state machine and, hence, a sequence of control signals may be generated and outputted on the signal lines based on updates of the state of the at least one programmable signal controlling state machine 140.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, the at least one programmable signal controlling state machine 140 may be used for providing different sequences of states for controlling an image sensor 100 in numerous different manners in addition to those described above. Thanks to the use of the programmable signal controlling state machine 140, a great flexibility for controlling the image sensor 100 is provided.

Also, a single programmable signal controlling state machine 140 may be provided, which may allow controlling the image sensor 100 to be used in different operational modes, even though different regions of interest may not be defined.

Further, a row controller may be provided as a simple row counter defining a row number to which the control parameters are to be applied, when advanced control of the programmable signal controlling state machine 140 in relation to regions of interest is not necessary.

The invention claimed is:

1. An image sensor comprising:
an array of pixels arranged in rows and columns;
readout circuitry for reading out image information from pixels in the array of pixels;
signal lines for providing control signals to the pixels in the array and/or the readout circuitry;
a programmable sequence controller configured to control the control signals provided on the signal lines, said programmable sequence controller comprising:
at least one programmable signal controlling state machine, which is configured to define a sequence of states and to define control parameters for the states in the sequence, wherein the control parameters include the control signals to be provided on at least one signal line for controlling at least one of a row of pixels or the readout circuitry;

at least one row controller, which is configured to define a row number in the array of pixels to which the state defined by the at least one programmable signal controlling state machine is to be applied;

a demultiplexer, wherein the demultiplexer is configured to receive control parameters including control signals from the at least one programmable signal controlling state machine and row selection information from the at least one row controller and wherein the demultiplexer is configured to output the control signals for provision on the signal lines of the at least one row indicated by the row selection information; and a state storage element, which is configured to receive control signals from the demultiplexer and is configured to store control signals for each row.

2. The image sensor according to claim 1, wherein the at least one row controller comprises at least one programmable row controlling state machine.

3. The image sensor according to claim 2, wherein the at least one programmable row controlling state machine and the at least one programmable signal controlling state machine are configured to communicate with each other, wherein the at least one programmable signal controlling state machine is configured to change states based on input from the at least one row controlling state machine.

4. The image sensor according to claim 3, wherein the programmable sequence controller comprises a plurality of programmable row controlling state machines and a plurality of programmable signal controlling state machines, wherein each pair of a programmable row controlling state machine and a programmable signal controlling state machine defines a separately controllable region of interest in the array of pixels.

5. The image sensor according to claim 1, wherein the programmable sequence controller comprises an input for receiving an external signal for re-programming the programmable sequence controller.

6. The image sensor according to claim 5, wherein the programmable sequence controller comprises a buffer memory and a re-programming memory, which each is configured to store a current set of states for the at least one programmable signal controlling state machine.

7. The image sensor according to claim 5, wherein the programmable sequence controller is configured to be re-programmed for dynamically changing an operational mode of the image sensor.

8. The image sensor according to claim 7, wherein the operational mode of the image sensor is changed between at least two operational modes in the group of: a global shutter mode; a rolling shutter high-resolution mode; a rolling shutter low-resolution binning mode; using different integration times for different regions of interest; and an analog-to-digital conversion calibration mode.

9. A camera comprising the image sensor according to claim 1.

10. A method for acquiring images using an image sensor comprising an array of pixels arranged in rows and columns, readout circuitry for reading out image information from pixels in the array of pixels, and signal lines for providing control signals to the pixels in the array and/or the readout circuitry; said method comprising receiving, by a demultiplexer, control parameters including control signals from at least one programmable signal controlling state machine based on a current state of the at least one programmable signal controlling state machine;

receiving, by the demultiplexer, row number information from at least one row controller for the array of pixels to which the state defined by the at least one programmable signal controlling state machine is to be applied;

generating and outputting, by a demultiplexer, control signals on the signal lines of the at least one row indicated by the row number information based on the control parameters to a state storage element configured to store control signals for each row; and updating state of the at least one programmable signal controlling state machine to change the control parameters output by the at least one programmable signal controlling state machine;

wherein a sequence of control signals are generated and outputted on the signal lines based on updates of the state of the at least one programmable signal controlling state machine, said sequence of control signals causing acquiring of an image frame by the array of pixels and/or calibration of analog-to-digital conversion of the readout circuitry.

11. The method according to claim 10, comprising acquiring a first image frame based on first instructions of the at least one programmable signal controlling state machine defining a first operational mode of the image sensor; receiving an external signal for re-programming the at least one programmable signal controlling state machine with second instructions; and acquiring a second image frame based on the second instructions of the at least one programmable signal controlling state machine defining a second operational mode of the image sensor.

12. The method according to claim 11, wherein the first frame is acquired in a rolling shutter high-resolution mode and the second frame is acquired in a rolling shutter low-resolution binning mode.

* * * * *